(12) United States Patent
Gilkison et al.

(10) Patent No.: US 11,486,785 B2
(45) Date of Patent: Nov. 1, 2022

(54) THERMAL MANAGEMENT SYSTEM FOR AIR DATA SENSOR MODULE

(71) Applicant: Rosemount Aerospace Inc., Burnsville, MN (US)

(72) Inventors: Brian Alan Gilkison, Shakopee, MN (US); Alexander N. Reid, St Louis Part, MN (US); Nathan Hoffmann, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 888 days.

(21) Appl. No.: 16/367,644

(22) Filed: Mar. 28, 2019

(65) Prior Publication Data

US 2020/0309630 A1   Oct. 1, 2020

(51) Int. Cl.
| | |
|---|---|
| *G01P 5/165* | (2006.01) |
| *B64D 15/12* | (2006.01) |
| *G01L 19/06* | (2006.01) |

(52) U.S. Cl.
CPC .......... *G01L 19/06* (2013.01); *G01L 19/0654* (2013.01); *G01P 5/165* (2013.01); *B64D 15/12* (2013.01)

(58) Field of Classification Search
CPC ........ G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001
USPC ..................................... 73/170.02, 700–756
See application file for complete search history.

(56) References Cited

U.S. PATENT DOCUMENTS

| | | | |
|---|---|---|---|
| 3,400,582 A | 9/1968 | Warner | |
| 4,830,164 A * | 5/1989 | Hays ................... | F16D 69/0408 192/70.14 |
| 6,510,740 B1 | 1/2003 | Behm et al. | |
| 6,672,152 B2 | 1/2004 | Rouse et al. | |

(Continued)

FOREIGN PATENT DOCUMENTS

| | | | | |
|---|---|---|---|---|
| CA | 2717927 A1 * | 4/2011 | ............ | B64D 15/20 |
| DE | 202014105763 U1 | 1/2016 | | |

(Continued)

OTHER PUBLICATIONS

Extended European Search Report dated Jul. 10, 2020, issued during the prosecution of European Patent Application No. EP 19213954.1.

*Primary Examiner* — Andre J Allen
(74) *Attorney, Agent, or Firm* — Locke Lord LLP; Joshua L. Jones; Scott D. Wofsy

(57) ABSTRACT

A thermal management system for a sensor module is disclosed that includes a housing enclosing the sensor module and having a bottom wall with a reception port formed therein, and a thermal isolation puck installed within the reception port formed in the bottom wall of the housing for reducing the rate at which thermal energy from a heater located within an adjacent flush static plate is lost to the housing.

13 Claims, 9 Drawing Sheets

(56) References Cited

U.S. PATENT DOCUMENTS

| | | | |
|---|---|---|---|
| 7,597,018 B2 | 10/2009 | Braun et al. | |
| 7,748,268 B2 | 7/2010 | Lull et al. | |
| 9,752,945 B2 | 9/2017 | Hedtke et al. | |
| 2019/0056425 A1 * | 2/2019 | Reid | B64D 43/00 |

FOREIGN PATENT DOCUMENTS

| | | | | |
|---|---|---|---|---|
| EP | 3567375 A1 * | 11/2019 | | B64D 15/16 |
| EP | 3567376 A1 * | 11/2019 | | B64D 15/00 |
| WO | WO-03027654 A2 * | 4/2003 | | G01N 27/18 |
| WO | WO-2006121321 A1 * | 11/2006 | | G01N 33/006 |

* cited by examiner

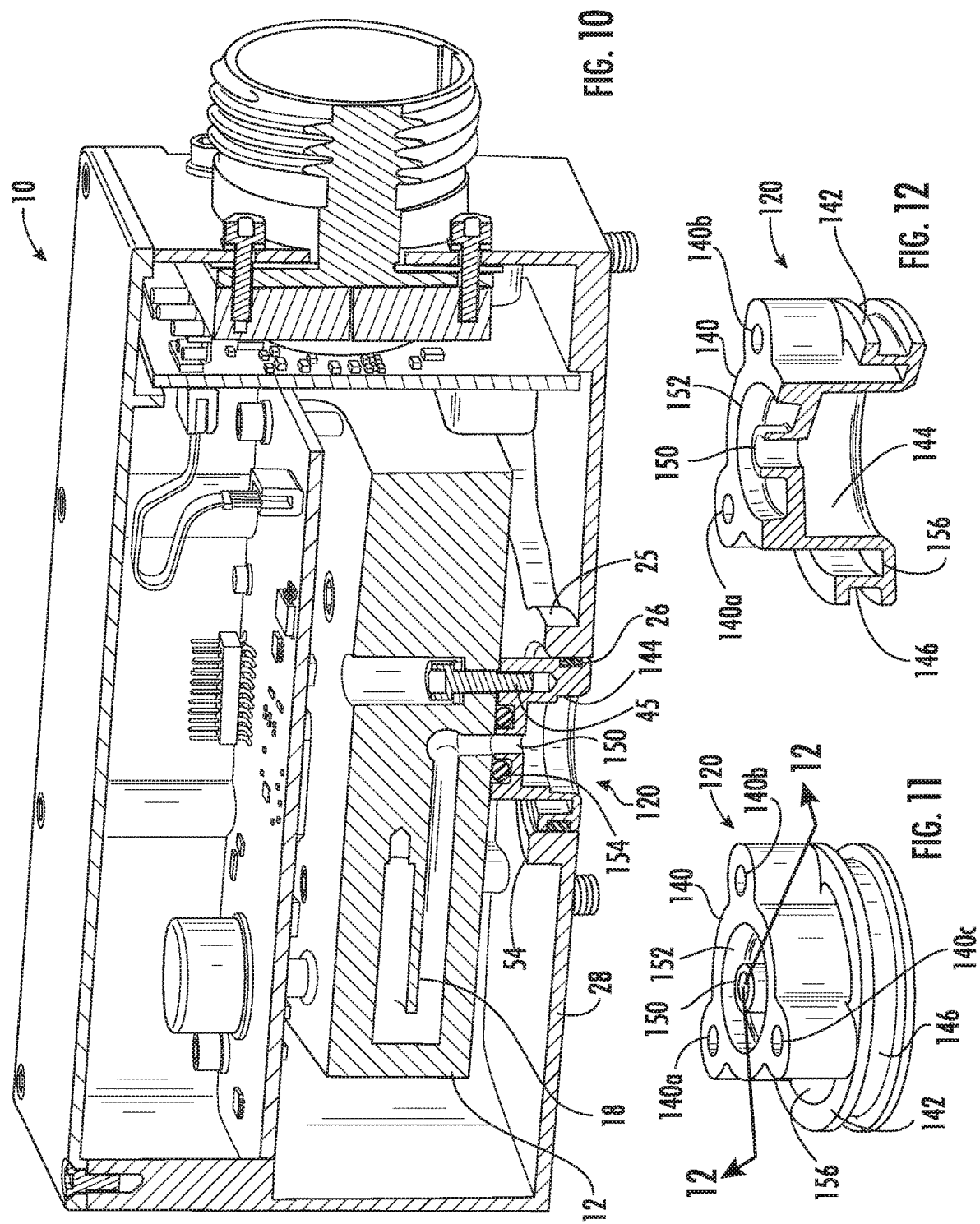

THERMAL MANAGEMENT SYSTEM FOR AIR DATA SENSOR MODULE

BACKGROUND OF THE INVENTION

1. Field of the Invention

The subject invention is directed to a thermal management system, and more particularly, to a thermal management system for a sensor module associated with an air data measurement device on an aircraft.

2. Description of Related Art

A variety of air data measurement devices are known in the art for aircraft flight control. One such air data measurement device is a flush static plate which can be used to sense atmospheric pressure outside of the aircraft. The atmospheric pressure is used to generate air data parameters (e.g., altitude, airspeed, angle of attack, angle of sideslip), which are provided to pilot displays in the cockpit of the aircraft.

A flush static plate can include a heater to regulate the local thermal environment internal to the aircraft and on the aircraft skin, and otherwise protect the sensing circuit. If not implemented properly, moisture can accumulate within the adjacent sensor module housing due to ingress or condensation, and this can have an adverse impact on the pneumatic path between the sensor module housing and the adjacent flush static plate. For this reason, the thermal energy from the heater in the flush static plate has been used to remove moisture and/or prevent condensation.

However, past technologies either did not sufficiently manage moisture within the pneumatic path, or they required added power to perform this task. The subject invention solves this problem by providing a thermal isolation puck that serves to keep thermal energy generated by the heater locally contained within the area of the pneumatic path.

SUMMARY OF THE DISCLOSURE

The subject invention is directed to a new and useful thermal management system for a sensor module associated with an air data measurement device on an aircraft. More particularly, the subject invention is directed to a thermal management system that includes a housing enclosing the sensor module and having a bottom wall with a reception port formed therein, and a thermal isolation puck installed within the reception port formed in the bottom wall of the housing for reducing the rate at which thermal energy from a heater located within an adjacent flush static plate is lost to the housing. To achieve this advantageous result, the housing is formed from a material having a relatively high thermal conductivity and the thermal isolation puck is formed from a material having a relatively low thermal conductivity.

The thermal isolation puck includes an upper body portion having an interior bore extending therethrough to provide a pneumatic pathway between the housing and the flush static plate, and a lower flange portion having means for sealing against a peripheral sealing surface of the reception port formed in the housing. Means are also provided for securing the upper body portion of the thermal isolation puck within the housing.

Preferably, the thermal isolation puck is formed with a thermal impedance region that extends at least partially about the central body portion radially inward of the lower flange portion to further reduce the rate at which thermal energy is lost to the housing. The thermal impedance region is defined by a plurality of evenly spaced channels that extend through a bottom surface of the lower flange portion of the thermal isolation puck.

A thermal impedance region may also be formed the bottom wall of the housing at least partially surrounding the reception port formed therein to further reduce the rate at which thermal energy lost to the housing. The thermal impedance region formed in the bottom wall of the housing is preferably defined by a plurality of evenly spaced channels, and the channels can be formed in an interior or exterior surface of the bottom wall of the housing.

In a preferred embodiment of the subject invention, the thermal management system includes a housing formed from a metallic material that has a relatively high thermal conductivity and encloses a sensor module, a flush static plate adjacent a bottom wall of the housing and configured to contain a heater for controlling a local thermal environment, and a thermal isolation puck formed from a metallic material that has a relatively low thermal conductivity and installed within a reception port formed in the bottom wall of the housing for reducing the rate at which thermal energy from the heater contained within the flush static plate is lost to the housing.

These and other features of the thermal management system of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those having ordinary skill in the art will readily understand how to make and use the subject invention without undue experimentation, preferred embodiments thereof will be described in detail herein below with reference to the figures wherein:

FIG. 10 is an enlarged cross-sectional perspective view of the sensor module housing shown in FIG. 1, illustrating another embodiment of the thermal isolation puck of the subject invention;

FIG. 11 is a perspective view of the thermal isolation puck shown in FIG. 10;

FIG. 12 is a cross-sectional perspective view of the thermal isolation puck, taken along line 12-12 of FIG. 11;

DETAILED DESCRIPTION OF THE PREFERRED EMBODIMENTS

Figure 1:
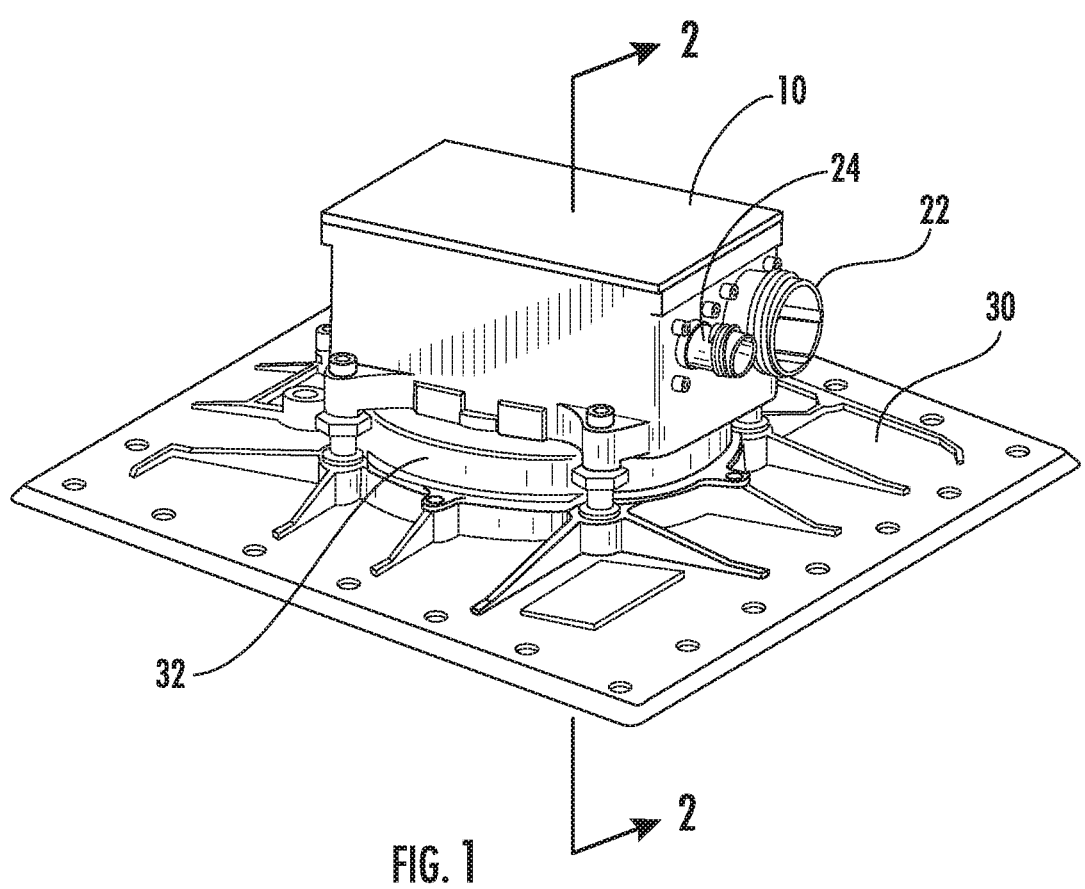
FIG. 1 is a perspective view of a sensor module housing associated with an air data measurement device in the form of a flush static plate mounted on a structural panel of an aircraft, which incorporates the thermal management system of the subject invention.

Referring now to the drawings wherein like reference numeral identify similar features or structures of the several embodiments of the subject invention, there is illustrated in FIG. 1 a sensor module housing 10 associated with an adjacent air data measurement device in the form of a flush static plate 30 that is mounted on a structural panel of an aircraft (not shown). The flush static plate 30 contains a heater (see FIG. 2) and it works in concert with the thermal management system of the subject invention. An example of a flush static plate with which the thermal management system of the subject invention could operate is disclosed in U.S. Pat. No. 8,365,591, the disclosure of which is herein incorporated by reference in its entirety.

Figure 2:
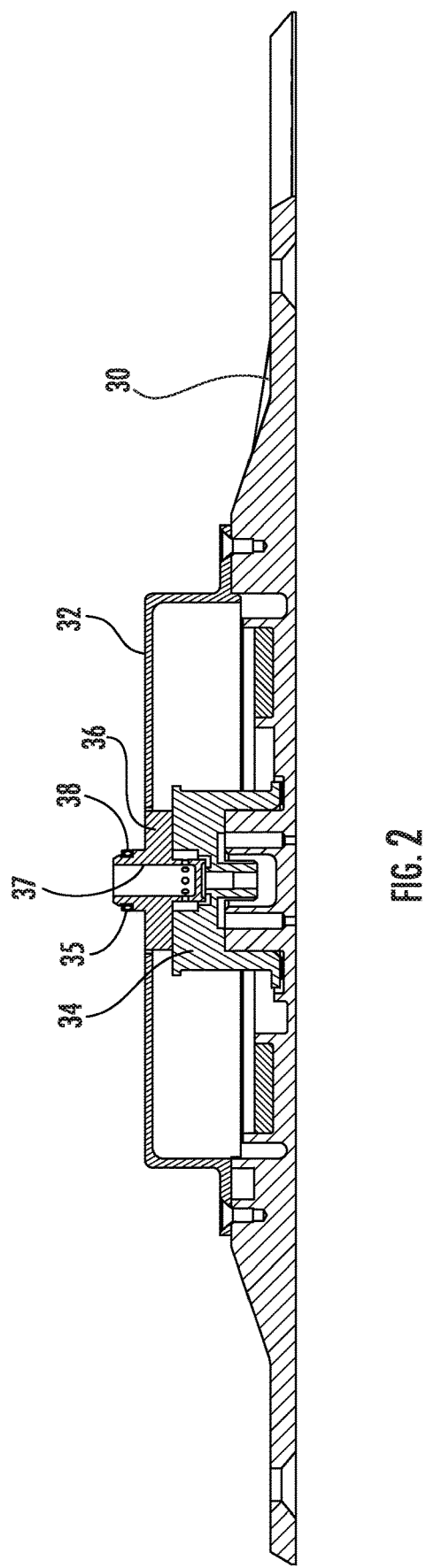
FIG. 2 is a cross-sectional elevational view of the flush static plate, taken along line 2-2 if FIG. 1, illustrating the heater housing that includes a heater.

Referring to FIG. 2, the flush static plate 30 includes an outer protective cover 32 that encloses a heater housing 34. The heater housing 34 is adapted and configured to support a heater that functions to control the local thermal environment of the flush static plate 30. The heater could be configured as a wire coil or a similar structure that would complement the geometry for the heater housing 34. A heater cap 36 sits atop and extends from the heater housing 34 and through the outer protective cover 32 of the flush static plate 30. A central bore 38 extends through the heater cap 36 to form a pneumatic pathway between the flush static plate 30 and the sensor module housing 10, as described in more detail below. It is envisioned that the heater cap 36 could be formed integral with or separate from the heater housing 34.

Figure 3:
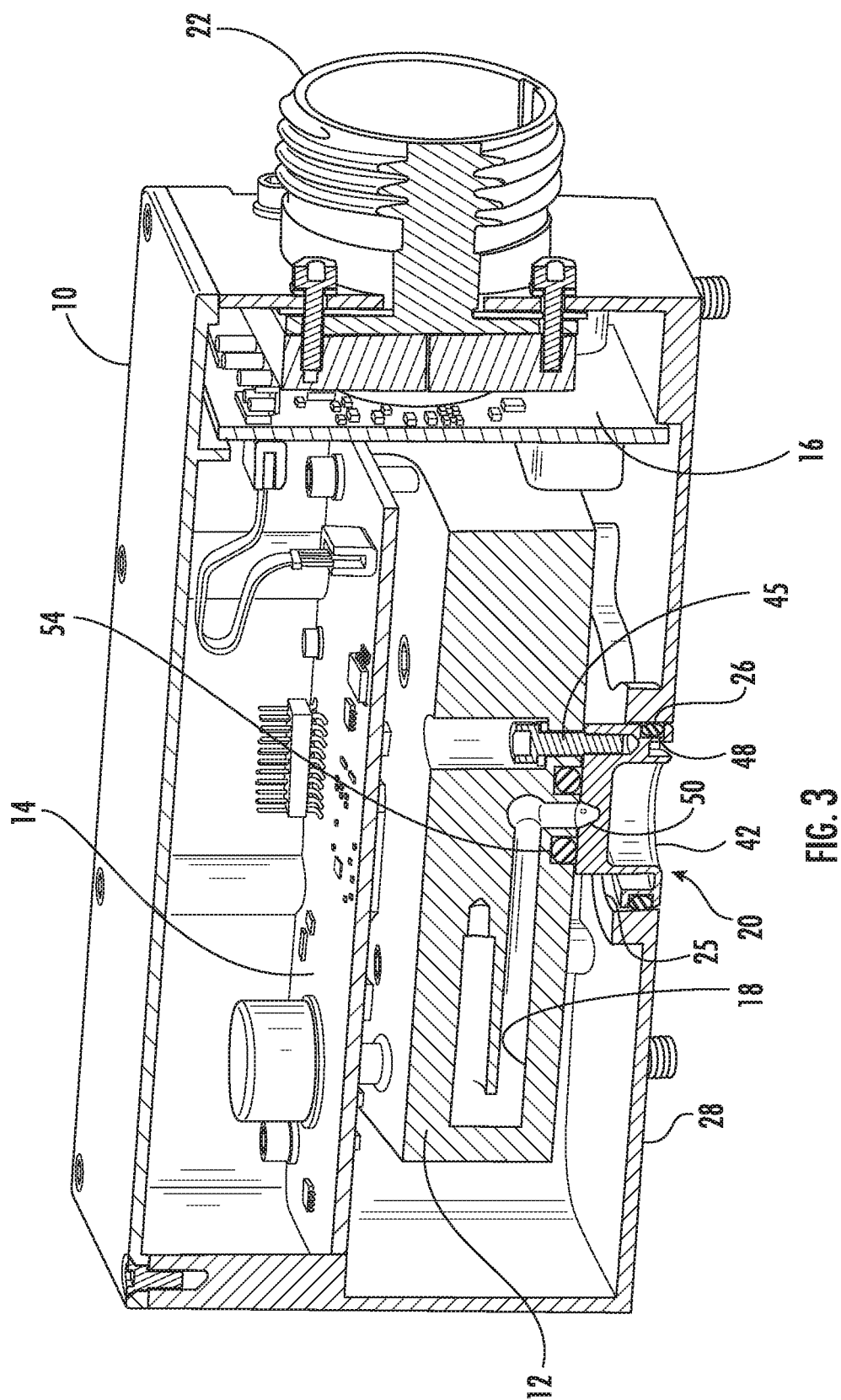
FIG. 3 is an enlarged cross-sectional perspective view of the sensor module housing shown in FIG. 1, illustrating the thermal isolation puck which forms part of the thermal management system of the subject invention.

Referring now to FIG. 3, the sensor module housing 10 is made from a lightweight metallic material that has a relatively high thermal conductivity, such as, for example, aluminum or a similar metallic material. The sensor module housing 10 encloses a pressure manifold 12 and associated printed circuit boards 14 and 16 each containing various electronic components and a pressure sensor. The pressure manifold 12 defines an internal pneumatic pressure path 18. The printed circuit boards 14 and 16 communicate with electrical connectors 22 and 24 (see FIG. 1) that provide input/output communications with the air data computer of the aircraft.

As best seen in FIG. 3, the sensor module housing 10 also includes a thermal isolation puck 20 that is installed within a reception port 26 formed in the bottom wall 28 of the sensor module housing 10 and fastened to the pressure manifold 12 in such a manner so as to communicate pneumatically with the pneumatic pressure path 18 defined therein. The thermal isolation puck 20 is a key component of the thermal management system of the subject invention. As explained in more detail below, the thermal isolation puck 20 is formed from a metallic material that has a relatively low thermal conductivity, such as, for example, stainless steel or a similar metallic material that will reduce the rate at which thermal energy from the heater located within the adjacent flush static plate 30 is lost to the bottom wall 28 of the sensor module housing 10 during ground and flight operations.

Those skilled in the art will readily appreciate that the incorporation of the thermal isolation puck 20 into the system of the subject invention results in increased operating temperatures along the pressure path, reducing the likelihood of moisture condensation within the sensor module housing 10 and increasing the efficiency of moisture removal. Furthermore, the temperature of the sensor module housing 10 is decreased, resulting in lower critical component operating temperatures and improved reliability.

Referring to FIGS. 4 through 7, the thermal isolation puck 20 includes an upper body portion 40 and a lower flange portion 42. The upper body portion 40 has an interior bore 44 extending therethrough to receive an upper neck portion 38 of the heater cap 36. The upper neck portion 38 of the heater cap 36 includes a sealing ring 35 for sealing against an interior surface of the bore 44 of the upper body portion 40. A central bore 37 extends through the heater cap 36 to communicate pneumatically with the interior bore 44 of the thermal isolation puck 20.

The lower flange portion 44 of the thermal isolation puck 20 includes an annular channel 46 formed on a peripheral surface thereof for supporting a sealing ring 48 (see FIG. 3) to seal against an inner peripheral sealing surface 25 of the reception port 26 formed in the bottom wall 28 of the sensor module housing 10. Those skilled in the art will readily appreciate that alternative means can be used to provide a seal between the lower flange portion 44 of the thermal isolation puck 20 and the inner peripheral sealing surface 25 of the reception port 26, such as, for example, a face seal or the like.

Figure 4:
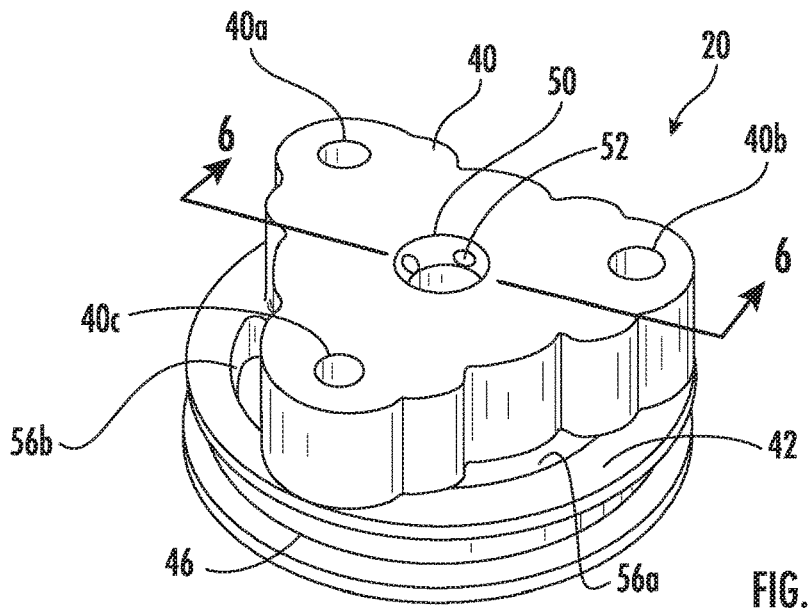
FIG. 4 is a perspective of the thermal puck shown in FIG. 3.

As best seen in FIG. 4, three circumferentially spaced fastener reception ports 40a-40c are formed in the upper body portion 40 of the thermal isolation puck 20 to receive respective fasteners 45 that secure the puck 20 to the pressure manifold 12 in sensor module housing 10. Those skilled in the art will readily appreciate that alternative means can be used to secure the thermal isolation puck 20 within the sensor module housing 10. For example, the thermal isolation puck 20 can be bonded, threaded or press-fit into the reception port 26 in the bottom wall 28 of the sensor module housing 10.

A central port 50 is formed in the upper body portion 40 of the thermal isolation puck 20, which defines part of the pneumatic pressure path of the system. The central port 50 communicates pneumatically with the pneumatic pressure path 18 in the pressure manifold 12. The central port 50 pneumatically communicates with a plurality of circumferentially spaced passageways 52 that distributively communicate with the interior bore 44 of the thermal isolation puck 20, as shown for example in FIG. 6. As best seen in FIG. 3, an annular face seal 54 is seated between the bottom surface of the pressure manifold 12 and the upper surface of the upper body portion 40 of the thermal puck 20. Those skilled in the art will readily appreciate that alternative sealing features could be employed in this location.

Figure 5:
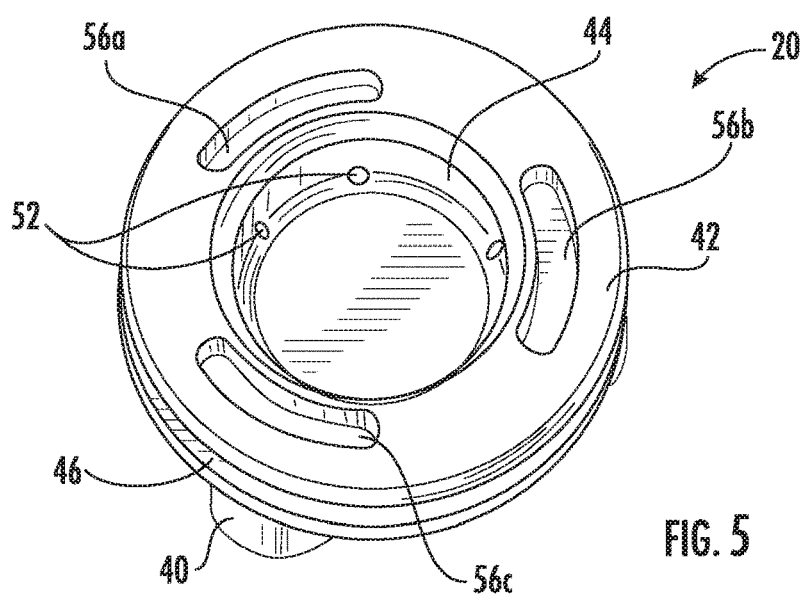
FIG. 5 is another perspective view of the thermal puck shown in FIG. 4.
Figure 6:
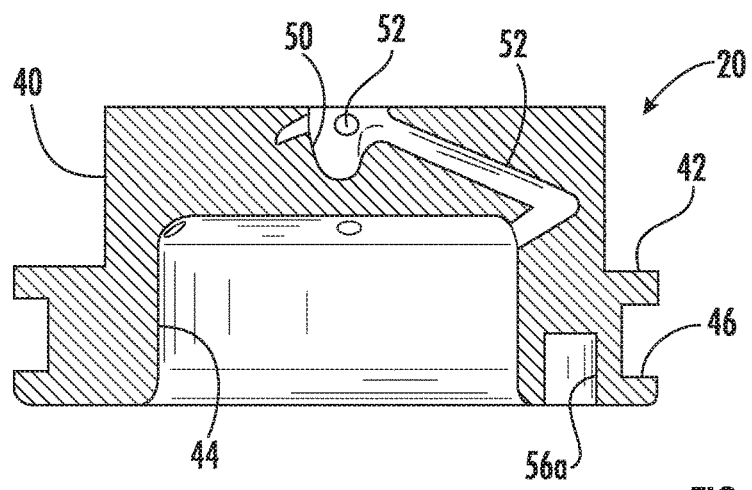
FIG. 6 is a cross-sectional view of the thermal puck taken along line 6-6 of FIG. 4.

The thermal isolation puck 20 is formed with a thermal impedance region that extends at least partially about the upper body portion 40 radially inward of the annular channel 46 in the lower flange portion 42. The thermal impendence region further reduces the rate at which thermal energy is lost to the bottom wall 28 of the sensor module housing 10. It includes three evenly spaced channels 56a-56c that extend through the bottom surface of the lower flange portion 42 of the thermal isolation puck 20, which are best seen in FIG. 5.

Figure 7:
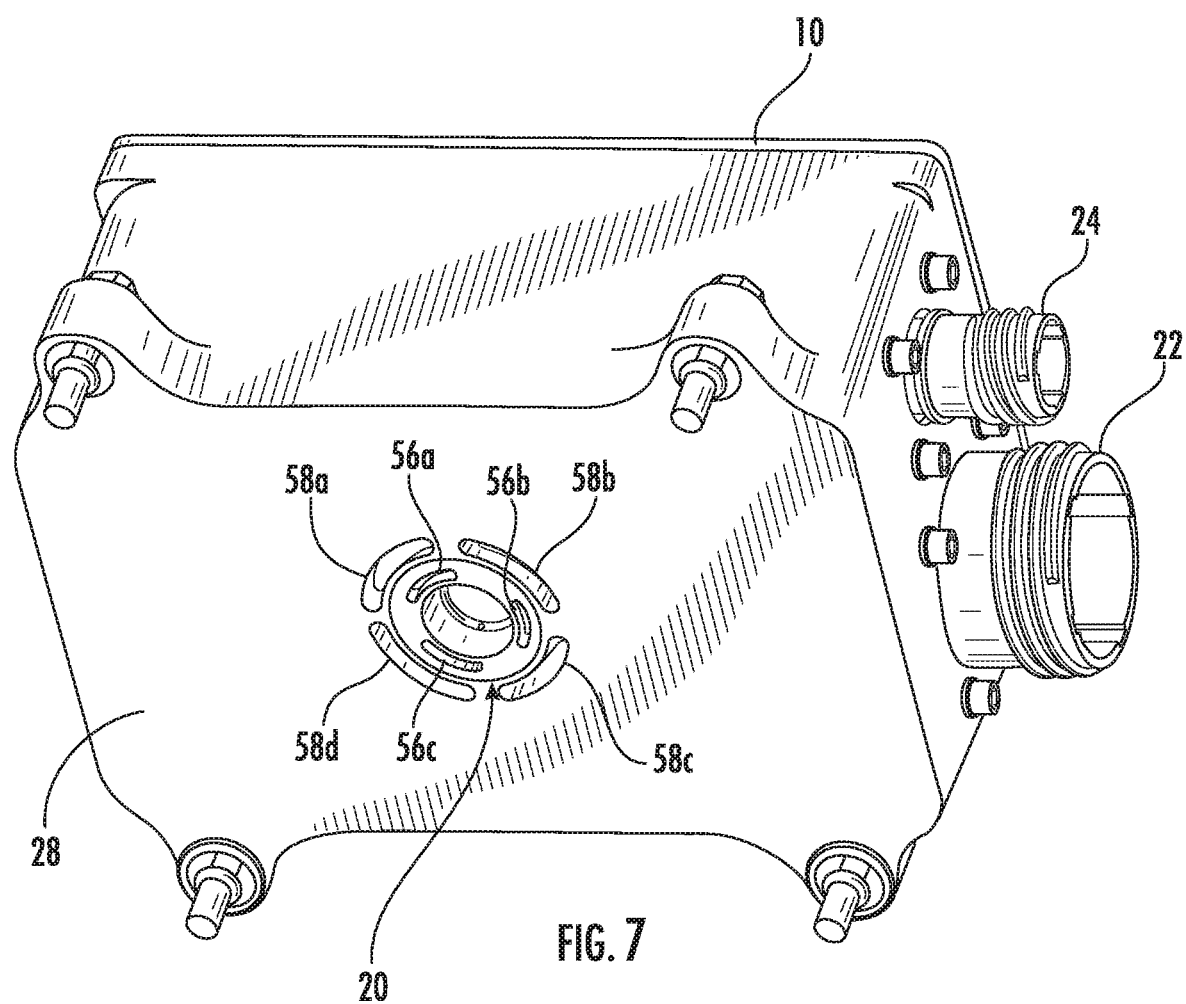
FIG. 7 is a perspective view of the sensor module housing shown in FIG. 1, as viewed from below, illustrating the thermal moat structures formed in the bottom surface of the thermal isolation puck and the thermal moat structures formed in the exterior surface of the bottom wall of the module housing.
Figure 8:
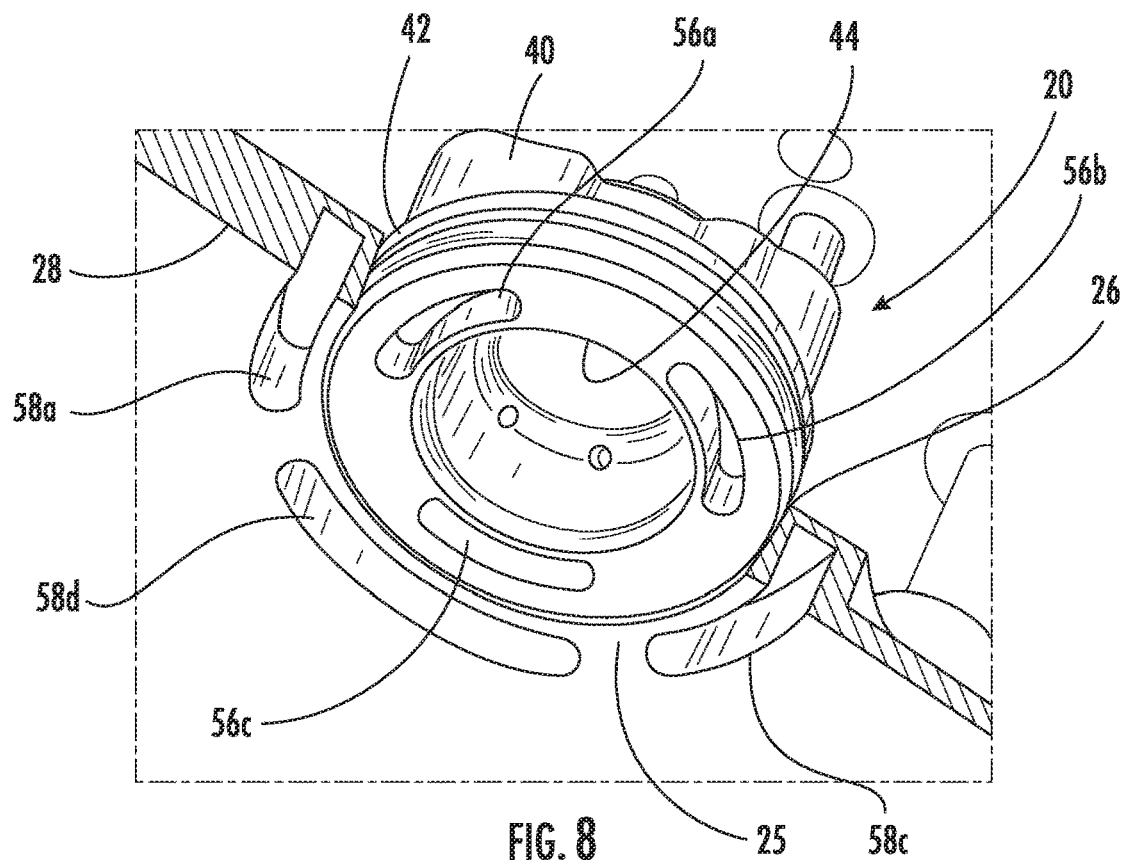
FIG. 8 is an enlarged localized view of the sensor module housing shown in FIG. 7, with the bottom wall broken away to illustrate the thermal isolation puck positioned in the reception port in the bottom wall of the housing.

Referring now to FIGS. 7 and 8, a thermal impedance region is also formed in an exterior surface of the bottom wall 28 of the sensor module housing 10, at least partially surrounding the peripheral sealing surface 25 of the reception port 26 formed therein to further reduce the rate at which thermal energy is lost to the sensor module housing 10. This thermal impedance region includes a four evenly spaced apart channels 58a-58d.

Figure 9:
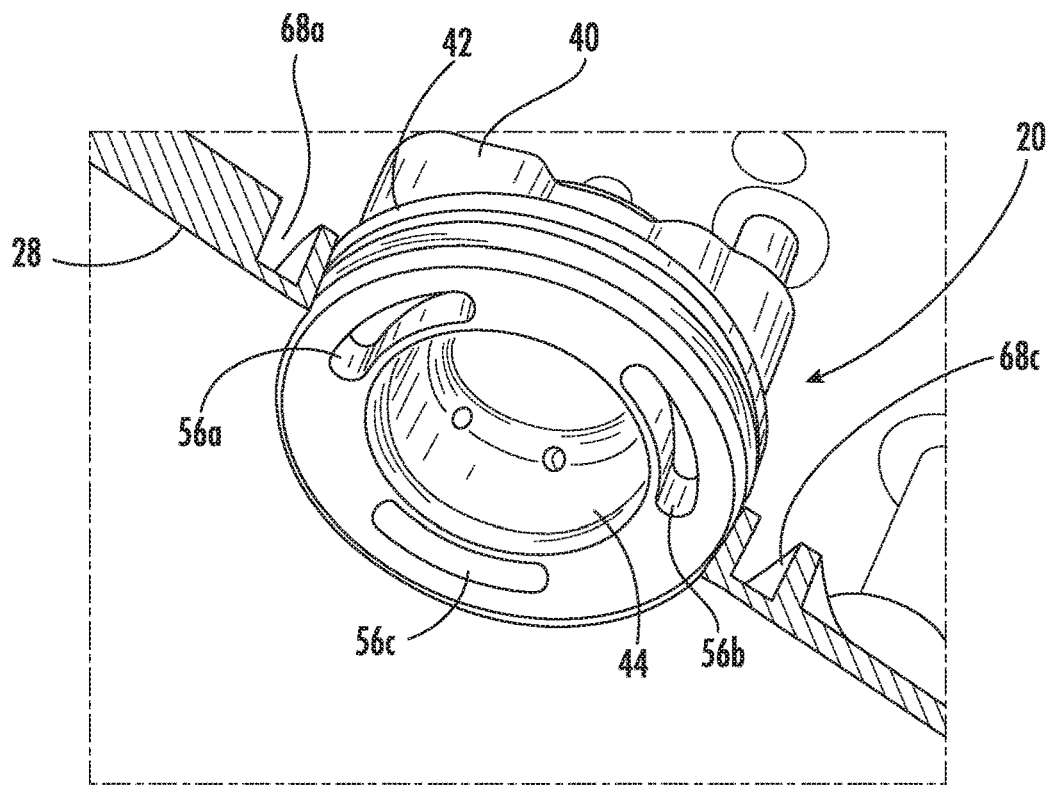
FIG. 9 is an alternative embodiment of the sensor module housing shown in FIG. 7, wherein thermal moat structures are formed in the interior surface of the bottom wall of the module housing.

Alternatively, as shown in FIG. 9, a thermal impedance region could be formed in the interior surface of the bottom wall 28 of the sensor module housing 10, at least partially surrounding the peripheral sealing surface 25 of the reception port 36, as shown by way of example by channels 68a and 68c. Those skilled in the art will readily appreciate that the number, shape, size, depth and/or location of the channels that define the thermal impedance regions in the bottom wall 28 of the sensor module housing 10 can vary by design to optimize the effectiveness of the thermal management system of the subject invention.

Referring now to FIG. 10, there is illustrated once again the sensor module housing 10, along with an alternative embodiment of the thermal isolation puck, which forms part of the thermal management system of the subject invention, and which is designated generally by reference numeral 120. The thermal isolation puck 120 includes an upper body portion 140 and a lower flange portion 142. The upper body portion 140 has an interior bore 144 extending therethrough to receive the upper neck portion 38 of the heater cap 36 shown in FIG. 2. The lower flange portion 142 has an annular channel 146 formed on a peripheral surface thereof for supporting a sealing ring 148 to seal against a peripheral sealing surface 25 of the reception port 22 formed in the bottom wall 24 of the sensor module housing 10. Alternative sealing features can be employed, including, for example, a face seal or the like.

Three circumferentially spaced fastener reception ports 140a-140c surround the upper body portion 140 of the thermal isolation puck 120 to receive respective fasteners 45 that secure the puck 120 to the pressure manifold 12 in sensor module housing 10. Alternative fastening means can be employed to secure the thermal isolation puck 120 within the sensor housing 10. A central port 150 surrounded by an annular sealing groove 152 is formed in the upper body portion 140 of the thermal isolation puck 120. The central port 150 defines part of the pneumatic pressure path of the system and it communicates directly with the interior bore 144 of the thermal isolation puck 120, as best seen in FIG. 12. The sealing groove 152 supports the annular seal 154 which seals the undersurface of the pressure manifold 12, as seen in FIG. 10. Alternative sealing features may be utilized in this location.

Figure 13:
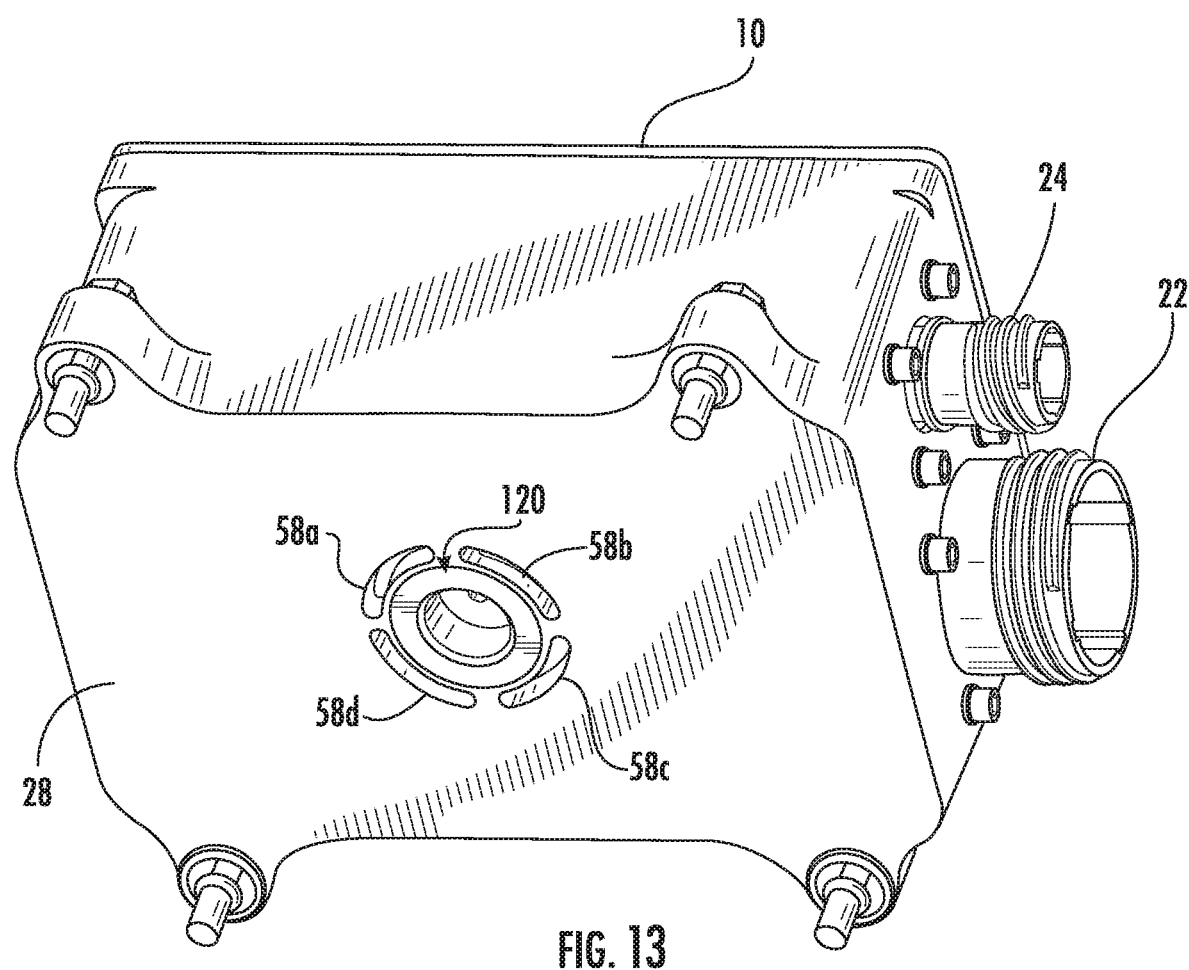
FIG. 13 is a perspective view of the sensor module housing shown in FIG. 10, as viewed from below, illustrating the thermal moat structures formed in the exterior surface of the bottom wall of the module housing.
Figure 14:
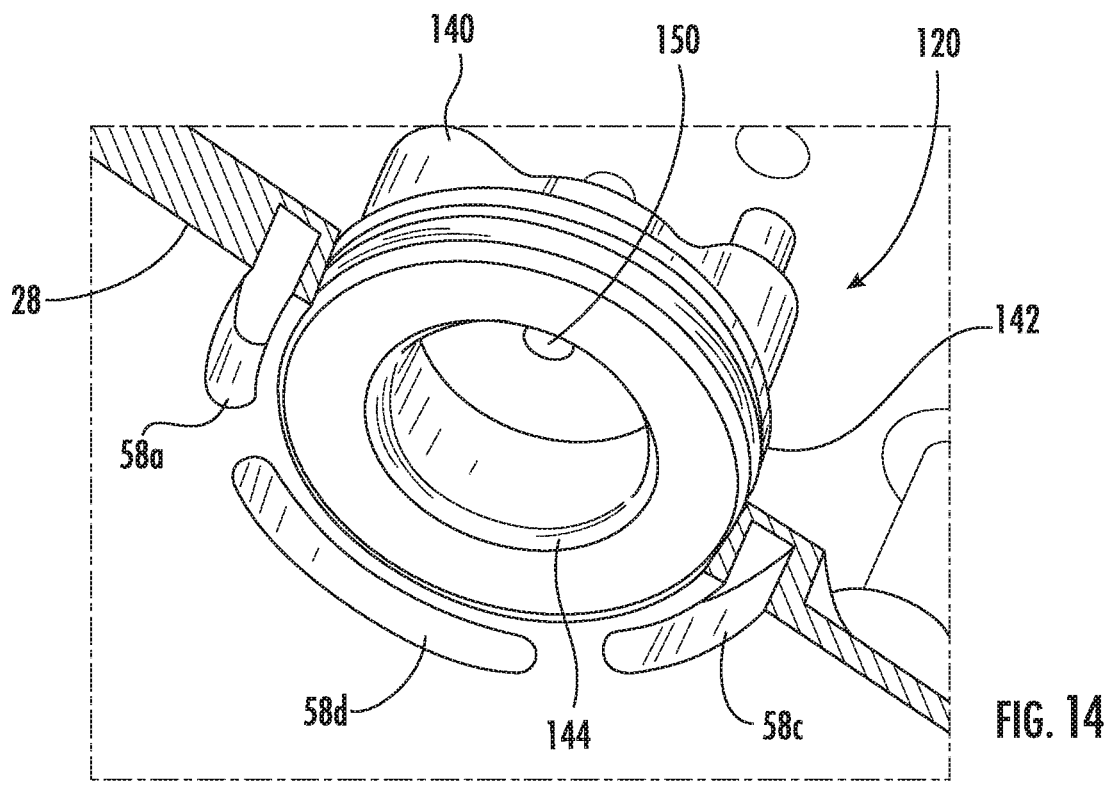
FIG. 14 is an enlarged localized view of the sensor module housing shown in FIG. 13, with the bottom wall broken away to illustrate the thermal puck positioned in the reception port in the bottom wall of the housing.
Figure 15:
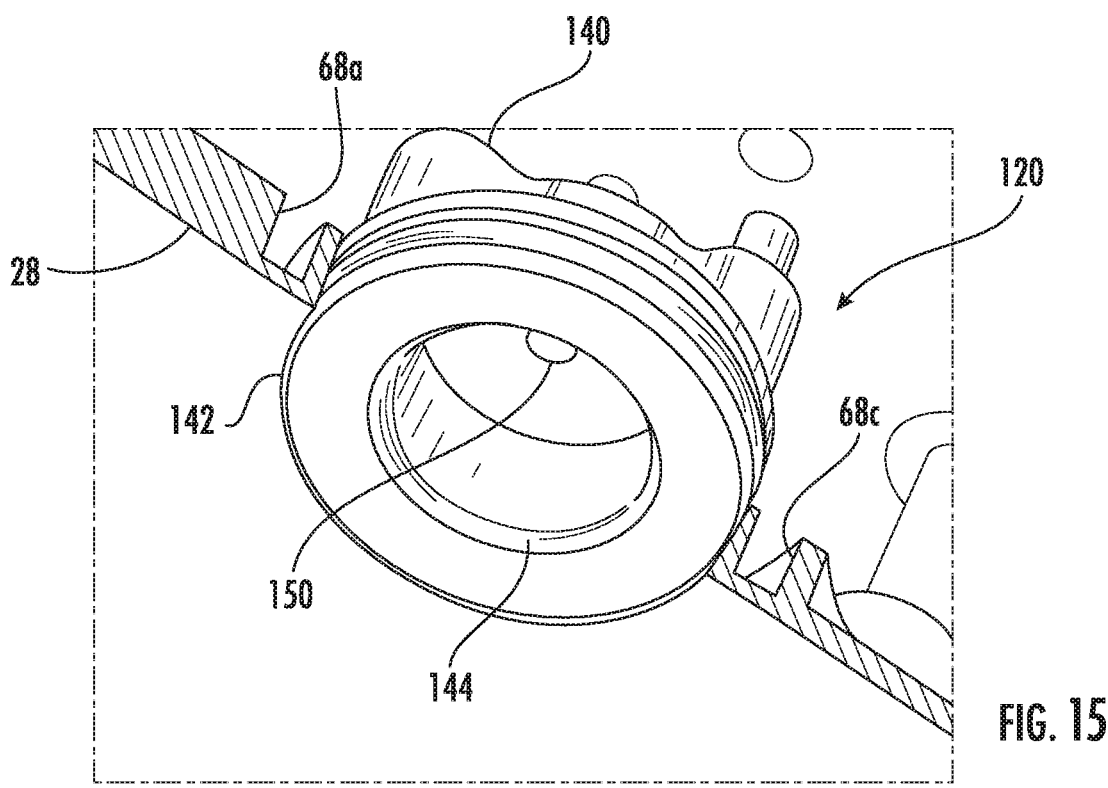
FIG. 15 is an alternative embodiment of the sensor module housing shown in FIG. 13, wherein thermal moat structures are formed in the interior surface of the bottom wall of the module housing.

The thermal isolation puck 120 is formed with a thermal impedance region that is defined by a channel 156 that surrounds or extends at least partially around the upper body portion 140 of the thermal isolation puck 120 radially inward of the annular channel 146 in the lower flange portion 144 to further reduce the rate of thermal energy lost to the sensor module housing 10. The thermal isolation puck 120 with its thermal impedance channel 156, together with the thermal impendence channels 58a-58d formed in the exterior surface of bottom wall 28 of the sensor module housing 10 shown in FIGS. 13 and 14, or together with the thermal impedance channels (e.g., 68a and 68c) formed in the interior surface of the bottom wall 28 of the sensor module housing 10 shown in FIG. 15, form the new and useful thermal management system of the subject invention. Moreover, the thermal isolation puck 120 and the thermal impedance channels formed in the bottom wall 28 of the sensor module housing 10 serve to keep thermal energy generated by the heater in the flush static plate 30 advantageously contained within the area of the pneumatic path.

While the subject disclosure has been shown and described with reference to preferred embodiments, those skilled in the art will readily appreciate that changes and/or modifications may be made thereto without departing from the scope of the subject disclosure.

What is claimed is:

1. A thermal management system for a sensor module, comprising:
    a) a housing enclosing the sensor module and having a bottom wall with a reception port formed therein; and
    b) a thermal isolation puck installed within the reception port formed in the bottom wall of the housing for reducing the rate at which thermal energy from a heater located within an adjacent flush static plate is lost to the housing, wherein the thermal isolation puck includes an upper body portion having an interior bore extending therethrough to provide a pneumatic pathway between the housing and the flush static plate.

2. A thermal management system as recited in claim 1, wherein the thermal isolation puck includes a lower flange portion having means for sealing against a peripheral sealing surface of the reception port formed in the housing.

3. A thermal management system as recited in claim 1, wherein means are provided for securing the upper body portion of the thermal isolation puck within the housing.

4. A thermal management system as recited in claim 2, wherein the thermal isolation puck is formed with a thermal impedance region that extends at least partially about the upper body portion radially inward of the lower flange portion to further reduce the rate at which thermal energy is lost to the housing.

5. A thermal management system as recited in claim 4, wherein the thermal impedance region is defined by a plurality of evenly spaced channels that extend through a bottom surface of the lower flange portion of the thermal isolation puck.

6. A thermal management system for a sensor module, comprising:
    a) a housing enclosing the sensor module and having a bottom wall with a reception port formed therein; and
    b) a thermal isolation puck installed within the reception port formed in the bottom wall of the housing for reducing the rate at which thermal energy from a heater located within an adjacent flush static plate is lost to the housing, wherein a thermal impedance region is formed in an exterior surface of the bottom wall of the housing at least partially surrounding the reception port formed therein to further reduce the rate of thermal energy lost to the housing.

7. A thermal management system for a sensor module, comprising:
   a) a housing enclosing the sensor module and having a bottom wall with a reception port formed therein; and
   b) a thermal isolation puck installed within the reception port formed in the bottom wall of the housing for reducing the rate at which thermal energy from a heater located within an adjacent flush static plate is lost to the housing, wherein a thermal impedance region is formed in an interior surface of the bottom wall of the housing at least partially surrounding the reception port formed therein to further reduce the rate of thermal energy lost to the housing.

8. A thermal management system as recited in claim 6, wherein the thermal impedance region formed in the exterior surface of the bottom wall of the housing is defined by a plurality of evenly spaced channels.

9. A thermal management system as recited in claim 7, wherein the thermal impedance region formed in the interior surface of the bottom wall of the housing includes a plurality of evenly spaced channels.

10. A thermal management system as recited in claim 1, wherein the housing is formed from a metallic material having a relatively high thermal conductivity and the thermal isolation puck is formed from a metallic material having a relatively low thermal conductivity.

11. A thermal management system for a sensor module, comprising:
   a) a housing formed from a metallic material that has a relatively high thermal conductivity and enclosing the sensor module;
   b) a flush static plate adjacent a bottom wall of the housing and configured to contain a heater for controlling a local thermal environment; and
   c) a thermal isolation puck formed from a metallic material that has a relatively low thermal conductivity and installed within a reception port formed in the bottom wall of the housing for reducing the rate at which thermal energy from the heater contained within the flush static plate is lost to the housing, wherein the thermal isolation puck has a thermal impedance region formed therein that extends at least partially about an upper body portion thereof to further reduce the rate at which thermal energy is lost to the housing.

12. A thermal management system for a sensor module, comprising:
   a) a housing formed from a metallic material that has a relatively high thermal conductivity and enclosing the sensor module;
   b) a flush static plate adjacent a bottom wall of the housing and configured to contain a heater for controlling a local thermal environment; and
   c) a thermal isolation puck formed from a metallic material that has a relatively low thermal conductivity and installed within a reception port formed in the bottom wall of the housing for reducing the rate at which thermal energy from the heater contained within the flush static plate is lost to the housing, wherein a thermal impedance region is formed in an exterior surface of the bottom wall of the housing at least partially surrounding the reception port to further reduce the rate at which thermal energy is lost to the housing.

13. A thermal management system for a sensor module, comprising:
   a) a housing formed from a metallic material that has a relatively high thermal conductivity and enclosing the sensor module;
   b) a flush static plate adjacent a bottom wall of the housing and configured to contain a heater for controlling a local thermal environment; and
   c) a thermal isolation puck formed from a metallic material that has a relatively low thermal conductivity and installed within a reception port formed in the bottom wall of the housing for reducing the rate at which thermal energy from the heater contained within the flush static plate is lost to the housing, wherein a thermal impedance region is formed in an interior surface of the bottom wall of the housing at least partially surrounding the reception port to further reduce the rate at which thermal energy is lost to the housing.

* * * * *